(12) United States Patent
Nehme

(10) Patent No.: US 6,304,271 B1
(45) Date of Patent: Oct. 16, 2001

(54) APPARATUS AND METHOD FOR CROPPING AN IMAGE IN A ZOOMING GRAPHICAL USER INTERFACE

(75) Inventor: Jad Nehme, New York Township, NY (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/245,205

(22) Filed: Feb. 5, 1999

(51) Int. Cl.⁷ ................................ G06T 15/30; G06T 3/40
(52) U.S. Cl. .............................. 345/434; 345/439
(58) Field of Search .................... 345/434, 439, 345/127, 130, 113, 118

(56) References Cited

U.S. PATENT DOCUMENTS

| | | | |
|---|---|---|---|
| 4,888,712 | * 12/1989 | Barkans et al. ................ | 345/118 |
| 5,003,497 | * 3/1991 | Priem ............................ | 345/419 |
| 5,488,684 | * 1/1996 | Gharachorloo et al. ........ | 345/423 |
| 5,581,796 | * 12/1996 | Koga et al. .................... | 345/433 |
| 5,719,592 | * 2/1998 | Misawa .......................... | 345/113 |
| 5,729,704 | * 3/1998 | Stone et al. .................... | 345/346 |
| 5,877,773 | * 3/1999 | Rossin et al. .................. | 345/434 |
| 5,977,985 | * 11/1999 | Ishii et al. ...................... | 345/433 |
| 6,028,584 | * 2/2000 | Chiang et al. .................. | 345/118 |
| 6,028,645 | * 2/2000 | Reid et al. ..................... | 345/578 |
| 6,052,129 | * 4/2000 | Fowler et al. .................. | 345/434 |
| 6,111,584 | * 8/2000 | Murphy .......................... | 345/430 |
| 6,137,497 | * 10/2000 | Strunk et al. .................. | 345/434 |
| 6,144,387 | * 11/2000 | Liu et al. ....................... | 345/427 |

* cited by examiner

*Primary Examiner*—Jeffery Brier
*Assistant Examiner*—Ryan Yang
(74) *Attorney, Agent, or Firm*—Lerner, David, Littenberg, Krumholz & Mentlik, LLP

(57) ABSTRACT

This invention provides a method and system for image cropping in a zooming environment. In a zooming engine, a clip stack and transform stack are provided for all images in a view. When a crop region is selected for an image, the image maintains its crop region in local coordinates. Prior to rendering, the image's local crop region coordinates are pushed on to the clip stack and the image's transform and view's transform are pushed onto a transform stack. A new screen transform is determined from the image transform and the view transform. The screen transform is applied to the image's clip region to provide clip region screen coordinates. These coordinates are pushed on the clip stack. The same transformation is applied to the image's uncropped bounding box coordinates. When the cropped image sends a draw call, the clip region is set and the image is rendered within the clip region and the transformed bounding box.

19 Claims, 7 Drawing Sheets

APPARATUS AND METHOD FOR CROPPING AN IMAGE IN A ZOOMING GRAPHICAL USER INTERFACE

CROSS REFERENCE TO RELATED APPLICATIONS

This application is related to the following:

U.S. patent application Ser. No. 09/211,666, entitled Polymorphic Event Handling for Zooming Graphical User Interface, filed Dec. 14, 1998;

U.S. patent application Ser. No. 09/211,280, entitled Interchangeable Pick Handler for Zooming Graphical User Interface, filed Dec. 14,1998;

U.S. patent application Ser. No 09/211,669, entitled Object Oriented Zooming Graphical User Interface, filed Dec. 14, 1998;

U.S. patent application Ser. No. 09/223,934, entitled Click-Through Pick Method For Group Objects In A Zooming Graphical Interface, filed Dec. 31, 1998;

U.S. patent application Ser. No. 09/239,652. entitled System and Method for Providing Zooming Video, filed Jan. 29, 1999;

U.S. patent application Ser. No 09/240,416, entitled Zooming Space Grid for Graphical User Interface, filed Jan. 29, 1999;

U.S. patent application Ser. No. 09/240,905, entitled Singleton/Universe Based Zooming Space for Graphical User Interface, filed Jan. 29, 1999, and All of the above listed patent applications are assigned to Sony Corporation of America, the assignee herein. All are herein incorporated into this disclosure by reference.

FIELD OF THE INVENTION

The present invention relates to a system and method for rendering an image, and particularly to a system and method for rendering a cropped image in a zooming environment.

BACKGROUND OF THE INVENTION

With the advent of the desktop computer, manual manipulation of images has been replaced to a large extent by manipulation of data from which images may be reconstructed. An image may be scanned and the resulting data stored and manipulated by the computer operating as an image processing system. Various kinds of image processing systems employ image editing, such as cropping, or other image processing operations. A computer implemented image editor processes stored images in accordance with edit operations and stores the edited images electronically for later use or for use in other systems.

Electronic image editing may be performed on a conventional desk top computer implementing a graphical user interface. In respect to image cropping, a known method of electronically producing cropped images on a computer implementing a graphical user interface is typically accomplished by defining a crop region for an image, extrapolating destination information from the source image, and constructing the destination image from the extrapolated information. This method of cropping requires the image editor to recalculate the extrapolation each time the image is moved or zoomed, resulting in relatively long process times. There is a need, therefore, for providing more efficient image cropping functionality for use in a zooming graphical user interface.

SUMMARY OF THE INVENTION

This invention provides an improved system and method for image cropping in a zooming environment, where the crop region becomes an attribute of the image in the image's local coordinates. By making the crop region an attribute of the zooming object image, an extrapolation need not be calculated each time the image is zoomed or moved. For purposes of this discussion, the terms object and image are used interchangeably when discussing image cropping functionality. A view object is a module which contains zooming objects displayed on, for instance, a screen. The view and the objects in the view have associated transforms describing their local coordinate system. The transform translates the object's local coordinates to global coordinates. Each zooming object and view object is bounded by a bounding box, the smallest geometric shape that circumscribes the object, and the image and view do not exceed their bounding boxes. For a view object, the transform also ensures that the view is centered with respect to the view's bounding box.

In a zooming engine according to the invention, a clip stack, transform stack and event handler are provided. When a crop region is selected for an image, the image obtains its crop region from the event handler object in coordinates local to the object, which coordinates are independent of the view (hereafter "local coordinates"). Prior to rendering, the view and the image are pushed on the transform stack. The transform stack calculates a screen transform from the existing view transform and object transform and any requested change to the view (e.g., a new level of zoom). The transform stack provides a screen transform operable to transform local coordinates to display screen coordinates.

The image's crop region coordinates are transformed to display screen coordinates using the display screen transform provided by the transform stack. The resulting transformation provides the display coordinates for drawing the image's crop region, and these coordinates are pushed onto the clip stack. The display screen transform is next applied to the image's bounding box coordinates to provide display screen coordinates for the image's bounding box. The crop region screen coordinates are read from the clip stack and its intersection with the image's screen coordinates are determined. A renderer then paints the intersection on the display and a cropped image appears at the desired level of zoom.

Selection of the crop region is implemented by an event handler, which is preferably implemented as a software object. The event handler is responsive to user inputs, preferably inputs from a mouse. When a user implements a cropping function on a zooming object, for instance by clicking on the object, the object calls the handler. The handler is responsive to mouse movements until the user releases the mouse or, alternatively, clicks the mouse on the object a second time. The event handler defines a crop region on the object as a box having opposite corners located by the mouse clicks and returns the crop region coordinates to the object. These coordinates are local coordinates.

BRIEF DESCRIPTION OF THE DRAWINGS

A more complete understanding of the present invention may be obtained from consideration of the following description in conjunction with the drawings in which.

DETAILED DESCRIPTION

A zooming graphical user interface according to the present invention is able to display, at multiple levels of magnification, selectively cropped images The zooming graphical user interface constructs graphic representations of the objects from stored information, which representations the user is able to magnify, reduce and pan. Magnification, also know as "zooming in", displays an object or group of objects in greater size and/or detail. Reduction, also know as "zooming out", displays an object or group of objects in smaller size and/or less detail. As objects are zoomed in and out, the scale of the zoomed level of detail increases and decreases causing objects to appear and disappear.

In an exemplary embodiment, the instructions implementing the image cropper and zooming graphical user interface of the invention are configured as a cooperating set of objects, where an object is a self-contained program unit written in an object oriented computer programming language, such as Java®. An object may include instructions (e.g. executable code) or data (e.g. operands) or both. Objects communicate with each other by way of predefined interfaces. As will be known to one of ordinary skill in the art, configuring software as a cooperating set of objects with predefined interfaces allows an individual object to be maintained or accessed without effecting the operations of other objects. Of course, other embodiments may be implemented using any platform independent language, such as PERL™, or any platform dependent language, such as C++ or Fortran.

Computer Architecture

Figure 1:
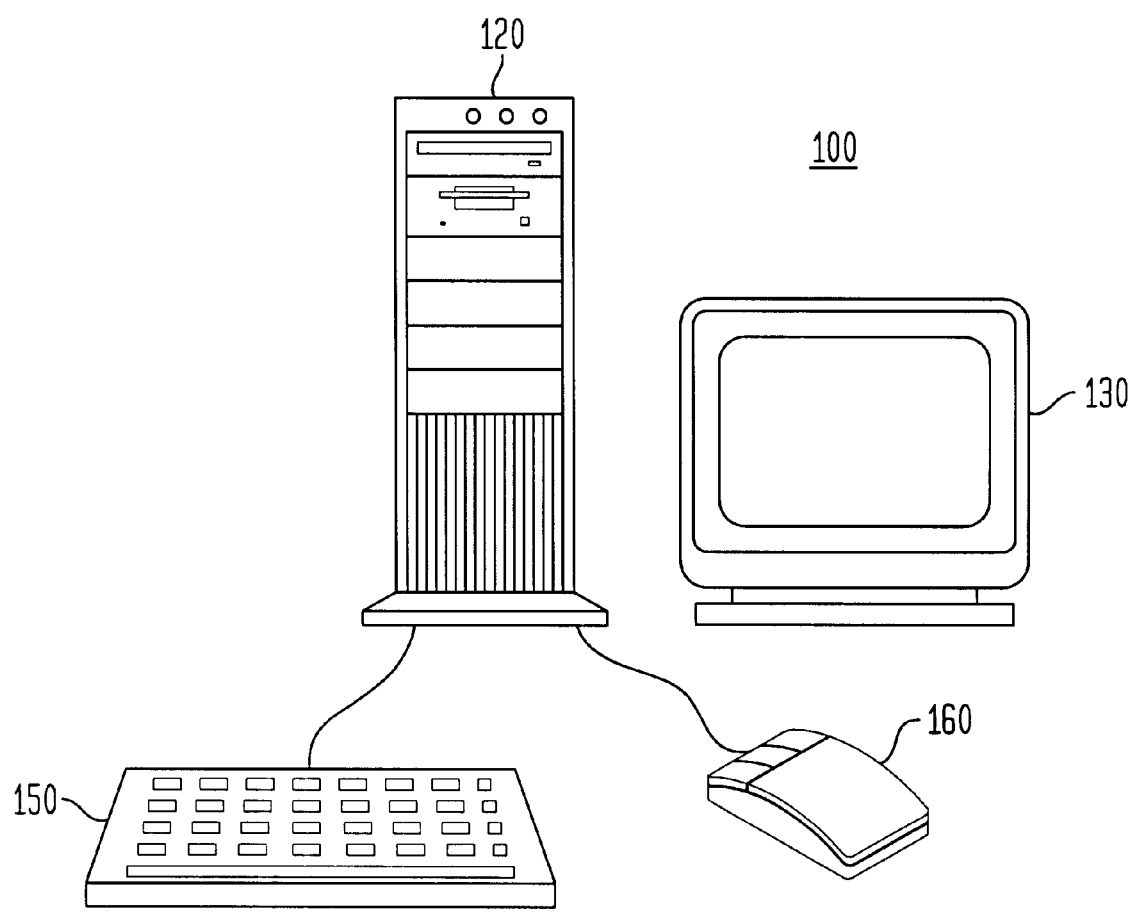
FIG. 1 shows an example of a computer system which may be used in conjunction with embodiments of the present invention.

FIG. 1 illustrates an exemplary computer system 100 which is adaptable for implementing the zooming graphical interface system according to the invention. The computer system 100 includes a main housing 120 connected to a monitor 130 and interactive input devices, in this example a keyboard 150 and mouse 160. The main housing 120 includes various items (not shown in FIG. 1) that are typically used in a computer system 100. By way of example, these elements may be a processor, ROM and RAM memory, cache memory, a hard disk storage device, a floppy disk drive, a storage tape drive, graphics and audio cards, a network interface card, and a power supply, all interconnected using a conventional architecture.

A computer system 100 configured as such provides visual output through a monitor 130 and audio output through speakers (not shown), and receives input through the keyboard 150, mouse 160, and possibly a microphone (not shown). The user can interface with the computer system 100 in conventional fashion, such as by positioning the screen cursor on a desired object using an interactive input device, such as mouse 160, and clicking (depressing a button of) the interactive input device, such action providing input to the system and identifying/selecting the desired object for further activity. For example, the user may use the mouse 160 to move a cursor about a graphical display and position the cursor over an icon for an application on the graphical display shown on the monitor 130. The user may then provide input to the system using the mouse 160 by a double click of a mouse switch 165 while the cursor is on the icon, such action typically operating to launch the application represented by the icon (i.e., cause it to be executed). The display and functionality may be referred to as a graphical user interface.

Although the illustrated computer system 100 is of the desktop type, it is noted that the present invention is equally applicable to other computer system types, such as the lap-top type and palm type. Additionally, although the preferred embodiment implements a mouse for moving a cursor and providing input, it is noted that various technologies for accepting input and displaying output will evolve, and that such evolving technologies are contemplated by the present invention. For example, instead of mouse and keyboard commands, audio commands may ultimately be used to update the display. These and other alternatives will be recognized by the ordinarily skilled artisan.

Figure 2:
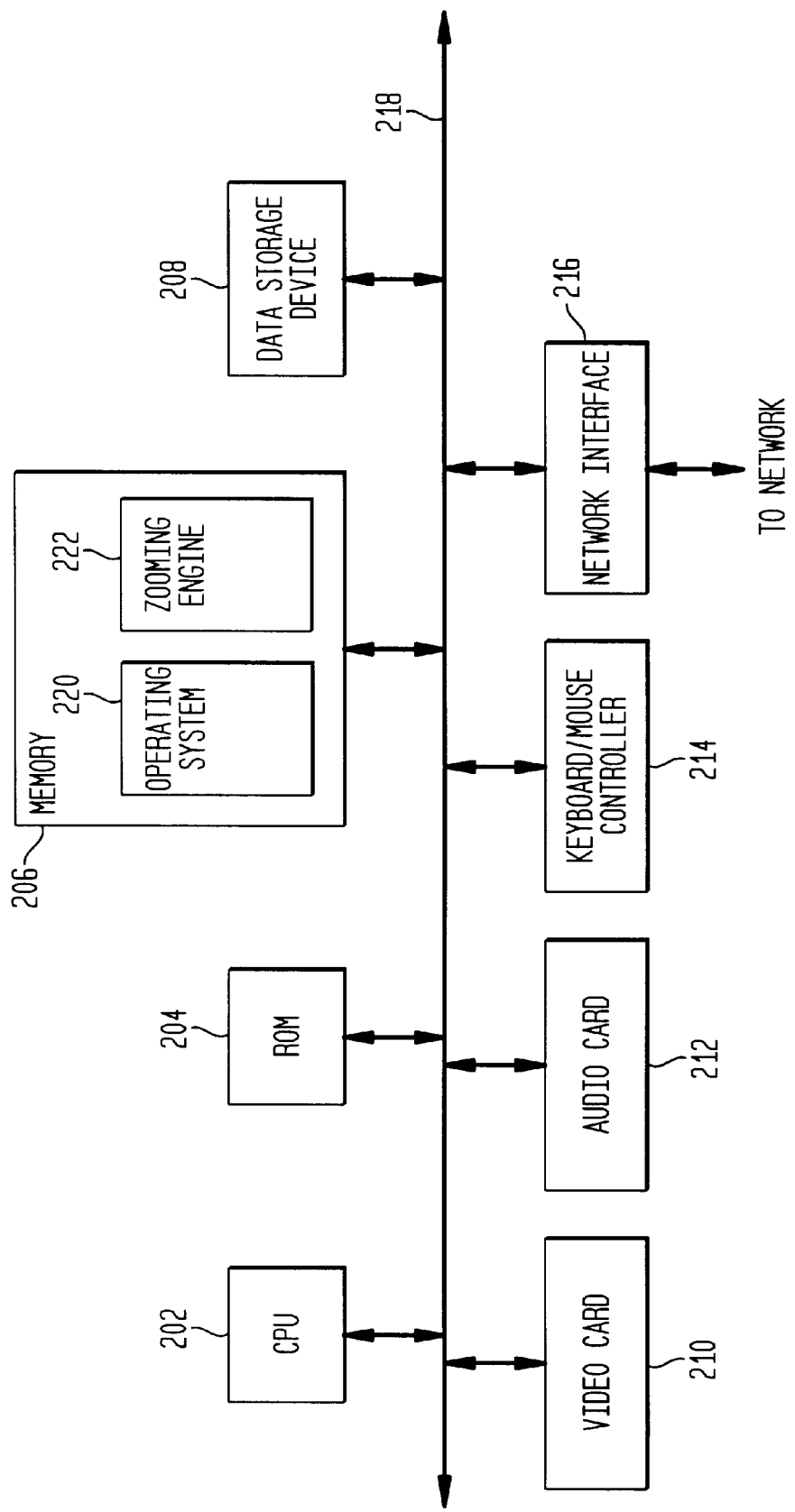
FIG. 2 illustrates an embodiment of a computer for implementing the invention.

The block diagram of FIG. 2 illustrates an embodiment of a computer 200 (the portion of the system 100 typically found in the main housing 120) that includes a CPU 202, ROM 204, memory 206, data storage device 208, video card 210, audio card 212, keyboard/mouse controller 214, and network interface 216, each coupled to a bus 218 in conventional fashion. The CPU 202 is a conventional processor, such as the PENTIUM™ type provided by Intel Corporation of Santa Clara, Calif. The CPU 202 executes instructions, such as those provided in ROM 204 and/or memory 206. ROM 204 is a read only memory, which retains its stored information even while it is disconnected from a power supply. The ROM 204 may, for example, store instructions for a boot up sequence. Memory 206 is preferably volatile memory for storing instructions and information used during ordinary operation, such as those provided in the computer operating system. The data storage device 208 provides long term data storage, and is preferably a magnetic or magneto-optic hard disk device. The video card 210 and audio card 212 respectively provide the interface between the computer 200 and the monitor and speakers. The keyboard mouse controller 214 interfaces the computer 200 and the keyboard and mouse that are used to provide input to the computer 200. The network interface 216 is a conventional network interface card that interfaces a local network line and the computer 200. The network interface card may be a conventional ethernet card, or may be a multipurpose interface for communication over a ethernet, ISDN and/or other networks. Access to the Internet can be provided through the network interface 216.

It is noted that a computer 200 may include different items than those noted in the described embodiment. For example, I/O ports for interfacing with printers and plotters, a floppy disk drive, a CD ROM drive, and various other features may be included, and various elements may be excluded. Also, although Internet access is described in connection with a network interface card, a modem connected to a conventional phone line can be used to access the Internet, such as through an internet service provider. The ordinarily skilled artisan will recognize the various alternatives for the computer 200.

Still referring to FIG. 2, the memory 206 also will include an operating system 220 and a zooming engine 222. The operating system 220 is a program that is typically loaded from the long term data storage device 208 (e.g., hard disk) to the main memory 206 during a boot up sequence. The operating system 220 manages the other programs in the computer, which are referred to as applications, and includes particular instructions and operations that can be used by the applications, either directly or through an application program interface. The operating system 220 also handles exchanges to and from devices connected to the computer (e.g., printers, disk drives, etc.), manages memory use, and allocates computing resources in multitasking environments.

The zooming engine 222, which will be described with more particularity below, includes instructions for updating the display 130 according to user and system input, including the zooming functionalities described in connection with the present invention. For example, the zooming engine 222 manages the various zooming objects that may be provided in a zooming space, determines the available display space, determines which zooming objects are visible in the available view space, and responds to various events to update the display, such as mouse and keyboard events which arise in response to the users navigation of the zooming space. Preferably, the zooming engine 222 is provided as software, although all or part of the zooming engine 222 may be provided as hardware, firmware, or a combination of software, hardware and firmware.

In the preferred embodiment, the system 100 utilizes a known computer operating system, such as UNIX®, WINDOWS 95® or WINDOWS 98®, found resident in area 220 of memory 206. When implemented as a set of instructions for a computer processor, the method of the invention is written in the Java® programming language, and the instructions, including the Java® virtual machine, can be found resident in area 220 in the memory 206 of the system 100. The Java® virtual machine, an abstract specification for a computing device, operates as an interface between the Javae application and the specific computer platform (e.g. Intel, Apple) on which the application is to be run. As is known in the art, Java® is a platform independent, object oriented programming language, the details of which are fully described by Sun Micro Systems, Inc. at its Internet website. The Sun Micro Systems website on the World Wide Web (WWW) can be located using its Uniform Resource Locator (URL), wwwjava.sun.com, and descriptive documentation concerning Java®, the Java® Development Kit and related products may be obtained at this website.

Image Cropping in a Zooming Space

Figure 3A:
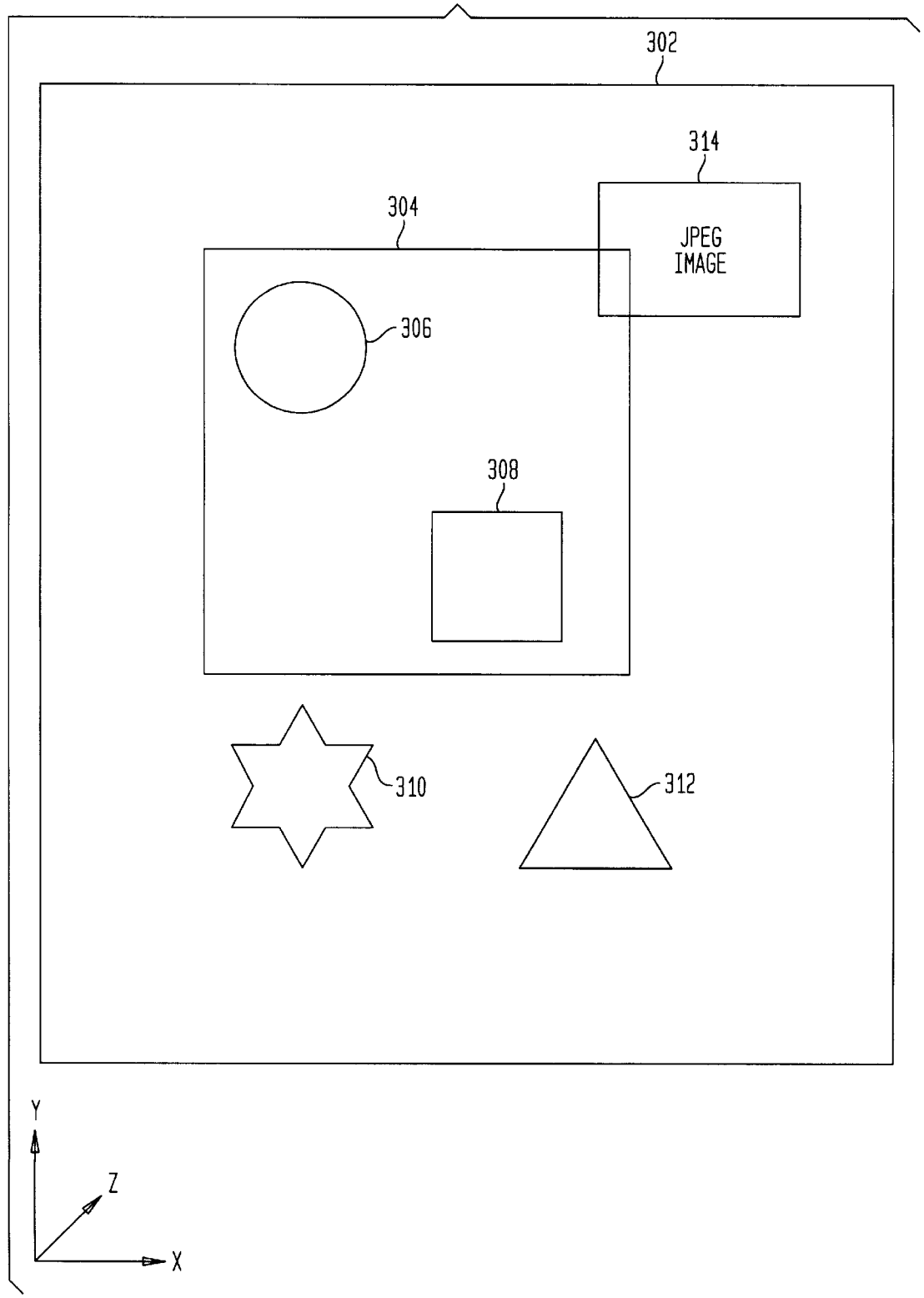
FIGS. 3A and 3B show exemplary functions according to the invention.
Figure 3B:
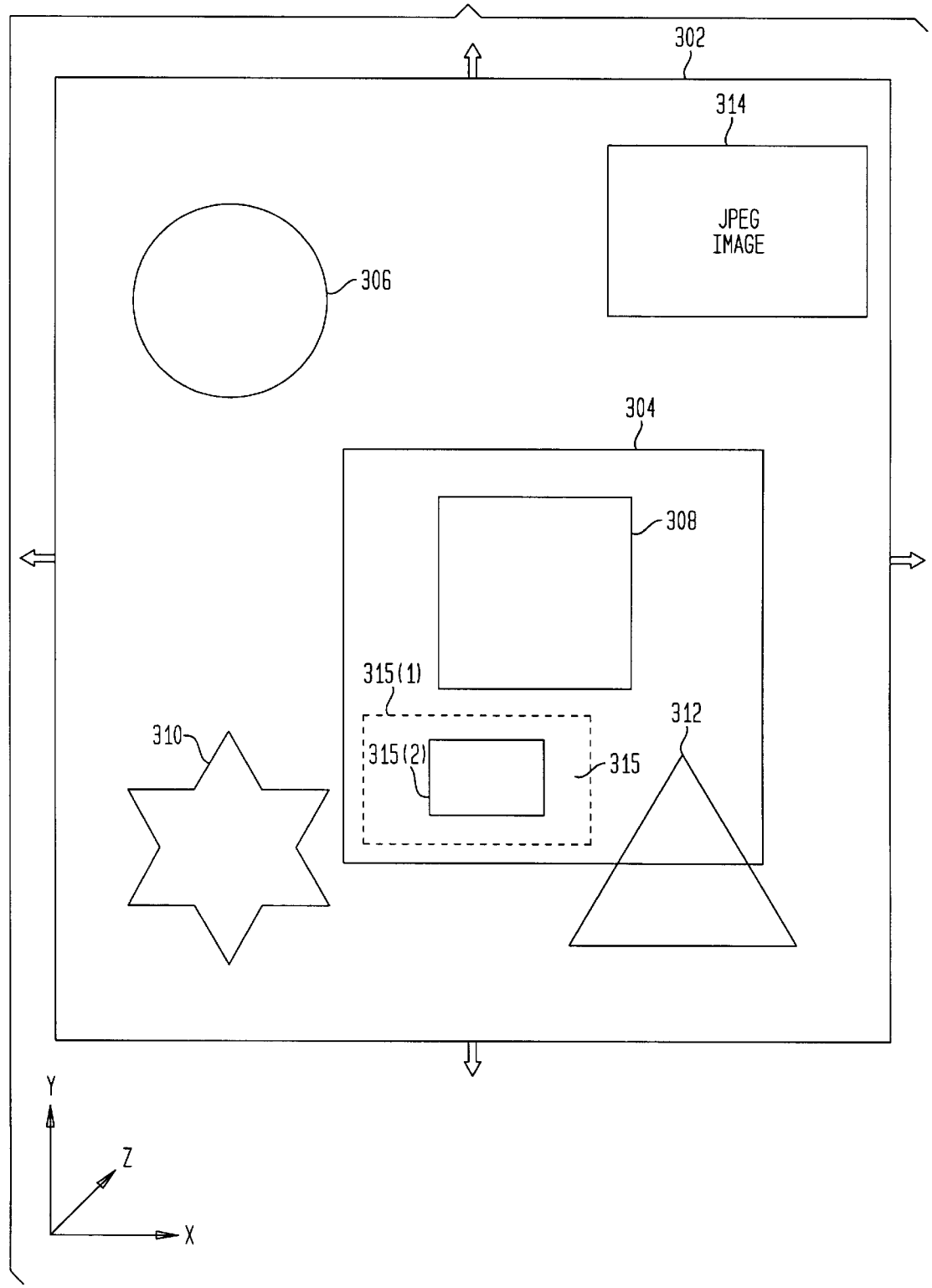

The schematic diagrams of FIGS. 3A and 3B illustrate the zooming space 302 and available viewing space 304, along with various zooming and image cropping functionality. For example, FIG. 3A illustrates a zooming space 302 including various zooming objects 306–314 including a circle 306, square 308, star 310, and triangle 312, which are graphical objects having particular sizes, shapes and colors. The edges of the zooming space 302 are shown for ease of illustration, and may not necessarily be part of the zooming space 302. The zooming space 302 may also include other types of zooming objects, such as complex still images, video images, or any type of object which may be displayed within the zooming space. Image objects may be photographs provided in conventional formats such as without limitation, JPEG, GIF, BMP, FlashPix, and others. Video objects may comprise standard video such as AVI, Quicktime, MPEG, and others. For example, the zooming space 302 of FIG. 3A includes a JPEG image 314. Objects also may comprise input tables and forms. The above listed zooming objects and object formats are for illustrative purposes and are by no means exhaustive. The ordinarily skilled artisan will recognize the various alternatives objects and object formats that can be readily substituted for those listed.

The zooming space 302 includes all of the zooming objects 306–314 that may be viewed by the user by navigating the zooming space 302. However, all of the zooming objects 306–314 might not be visible at a given time, since the available view space 304 may not be large enough to encompass the entire zooming space 302. For example, in FIG. 3A the available viewing space 304 covers the circle 306, square 308 and a portion of the JPEG image 314.

Typically, the available view space 304 is dictated by the display device 130 and its configuration. Thus, the available view space 304 may be the maximum display area for the display device 130. Additionally, in an environment where the zooming engine 222 works in conjunction with an operating system 220, the available view space may be related to features provided by the operating system 220. For example, the usable display area for an open window in a WINDOWS operating system 220 may be the available view space 304. Thus, the available view space 304 can change by using conventional controls for maximizing the window, or altering the locations of the sides of the window.

The user can navigate the zooming space 302 in three dimensions. Generally, movement in the X and Y directions, corresponding to the planar surface of the display device available view space an be referred to as panning, while navigation in the Z direction can be referred to as "zooming". Navigation in the Z direction (into or out of the display screen) causes the perspective of the available view space 304 to appear to zoom into or away from the zooming objects in the zooming space 302.

Navigation into the display screen (the +z direction) causes the zooming objects to appear to become closer to the viewer, and thus larger. This may be referred to as "zooming in." This also causes the perceived separation of the zooming objects to increase, which may cause a zooming object to leave the available view space 304. To "zoom in", the user marks information desired for viewing in greater detail with a cursor and operates the input device in a manner to cause the desired information to be magnified.

Navigation out of the display screen (the −z direction) causes the zooming objects to appear to become further away from the user, and thus smaller. This may be referred to as "zooming out." Of course, as the user zooms out, the perceived separation of the zooming objects decreases as well, and additional zooming objects may come into the available zooming space 304. To "zoom out", the user marks information desired for viewing in lesser detail with a cursor and the desired information is reduced in size, thereby displaying a larger portion of the chosen information. All zooming operations can be responsive to conventional interactive input commands. For example, depressing the left mouse key can cause a zoom in, and depressing the same button with the keyboard shift key depressed can cause a zoom out.

FIG. 3B illustrates image cropping in the zooming space 302. As shown in FIG. 3B, a crop region 315(2) has been defined for an image 315. The image 315 has a bounding box 315(1). Dashed lines are used to represent the bounding box 315(1) to show that it does not appear on the display. The crop region 315(2) is preferably defined in response to user selections, such as with a mouse. Once a crop region is defined, the image 315 is rendered such that only the crop region 315(2) appears. The rendered crop region 315(2) appears within the view space 304 and within the image's bounding box 315(1). As will be described, screen coordinates for the bounding box 315(1) and crop region 315(2) are determined by applying the same transform. A transform is an operation for converting local coordinates to some other coordinate space.

Image Cropper and Zooming Engine Architecture

Figure 4:
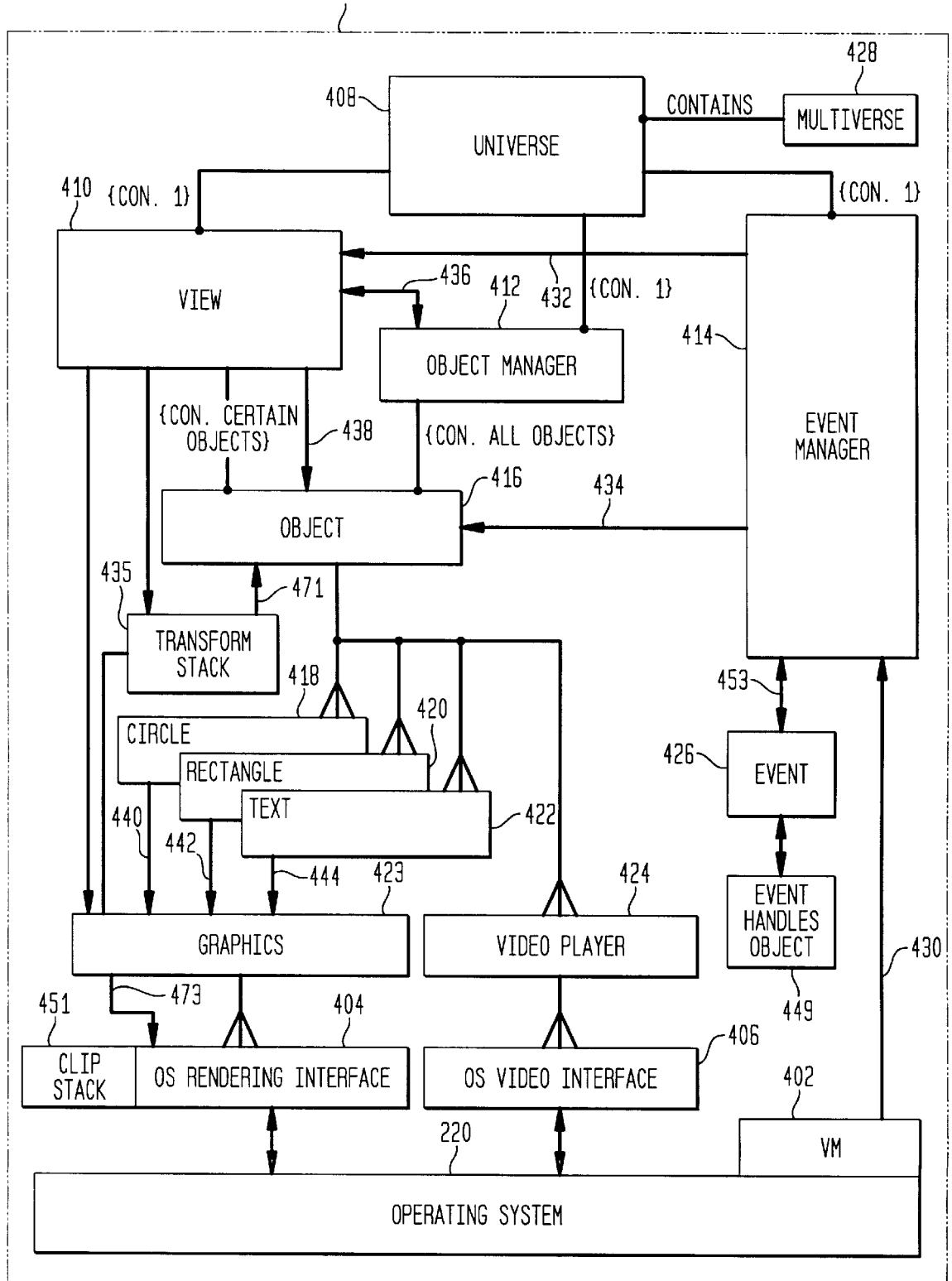
FIG. 4 schematically illustrates an exemplary architecture according to the invention.

The block diagram of FIG. 4 illustrates an embodiment of a zooming engine 222 architecture for facilitating zooming graphical user interface functionalities such as those contemplated by the method of the invention. The preferred zooming engine 222 embodiment is implemented in the Java® programming language and the virtual machine (VM)

402 is a Java® VM. Interfaces 404, 406 between the zooming engine 222 and operating system 220 may also be provided, such as those for rendering graphics 404 and video 406 using the operating system 220. These interfaces 404–406 may comprise conventional facilities for interfacing with the operating system 220 such as dynamic link library (DLL) files, and/or the Microsoft DirectDraw and DirectShow SDK for the WINDOWS environment.

The zooming engine 222 includes a universe module 408 which is the highest level module corresponding to a given zooming space. The universe module 408 contains a view module 410, an object manager module 412, and an event manager module 414. These modules 408–414 include instructions which, when executed, perform the various functions described in connection with them. Although the modules 408–414 (as well as the additional submodules directly or indirectly associated with them) will likely be provided as software, their functionality may also be produced by using hardware or firmware.

The illustrated universe module 408 and all of its submodules pertain to a single zooming space. Multiple instances of zooming spaces may be provided, as the multiverse 428 may contain numerous zooming spaces which would each comprise its own universe module 408 and appropriate submodules.

Such a multiverse facility is described further in the above referenced application Ser. No. 09/240,905, entitled Singleton/Universe Based Zooming Space for Graphical User Interface.

Referring again to the object manager module 412, that module controls all of the objects in the zooming space, which zooming objects are defined by the zooming object module 416, and subclasses thereof, such as circle module 418, rectangle module 420, text module 422, and video player module 424. The branches, such as those shown between the zooming object module 416 and subclasses 418–424, indicate that multiple instances of each subclass may be instantiated. For example, there may be more than one circle object, with each circle object inheriting the characteristics of the superclass zooming object module 416, as well as from circle module 418. Additionally, there may be other relationships which need not be shown for an understanding of the invention. For example, the zooming object module 416 could have a quadrilateral module as a subclass, which in turn could have square module and rectangle module subclasses.

The zooming engine 222 may interface with various operating systems 220. Where this is the case, the graphics module 423 interfaces the zooming engine 222 to the appropriate OS rendering interface 404. Similarly, there may be various different video player modules 424, which in turn may be ported to various operating system 220 interfaces. Alternatively, the zooming engine 222 may operate as a pure Java® embodiment which does not require the specific rendering and video interfaces in order to operate with a particular operating system 220.

The event manager module 414 produces event objects 426 responsive to system events (arrow 430) such as mouse and keyboard events initiated by the user. The event objects 426 are then passed, along with event handling information, to the view module 410 (arrow 432) and/or the zooming object module 416 (arrow 434) so that the display can be appropriately updated. As will be more fully explained hereafter, when image cropping is invoked, the event manager produces an event handler object 449 for setting a crop region.

The view module 410 contains at least one set of zooming objects selected from those in the zooming space and may receive, as illustrated by request and receipt arrow (436), information about the zooming objects from the object manager 412. Typically, the view module 410 contains those zooming objects which reside in the main zooming view. They may be associated to the same index used by the object manager 412. This allows the various objects in a view to be separately organized in the view module 410, so that separate calls to the zooming object module 416 are not required. For example, the view module 410 can issue commands (arrow 438) which are propagated through the object module 416 and any relevant subclass modules to affect rendering of many zooming objects contained in the main zooming view.

Individual or groups of zooming objects may be separately targeted for update responsive to event information passed directly to the zooming object module 416 by the event manager 414, and rendering commands would be more directly issued by the objects, such as is depicted by arrows 440–444. An example of such an update could be responsive to user selection and manipulation of a single object, such as image cropping.

Image cropping for the zooming engine 222 is implemented with an event handler object 449, a clip stack 451, and a transform stack 435. The event handler object 449 is one type of event object 426 produced by the event manager 414, and event handler 449 communicates with image objects 418–422 for purposes of establishing the local coordinates of the crop region as one of the object's (418–422) attributes. The transform stack 435 communicates with view 410 and with image objects 418–422 for receiving their respective transforms and the view's bounding box, as shown by arrow 471. The transform stack 435 provides a screen transform for determining screen coordinates from local coordinates.

The transform stack 435 is initialized to the identity transform. If no new level of zoom is chosen, the stack 435 will provide an operation which will render the cropped image at the identical level of zoom. If a new level of zoom is chosen, the stack 435 operates on the view's transform and the object's transform such that the stack 435 provides a transform operable to yield screen coordinates displaying the cropped image at the desired level of zoom. A view's transform (the operation for converting local coordinates to screen coordinates) accounts for the view's bounding box. This ensures that the view is properly centered relative to the view's bounding box so that objects in the view appear at the center of the display relative to the user. When a view is pushed onto the transform stack 435, the stack 435 combines the view's transform with any transform on top of the transform stack 435, such as the transform necessary to paint the image at a new level of zoom.

A transform of an object may not account for the bounding box of the object, and may merely convert local to global coordinates. When such an object is pushed on the transform stack 435, the stack 435 combines the object transform with the transforms already on the stack 435. These may be the prior view transform, the new view transform or the identity transform. In other words, the stack 435 acts as an accumulator, collecting the transforms of all objects and views pushed onto it. When the stack 435 provides a transform operable to provide screen coordinates, the coordinates are such that the image appears in the view and at the center of the display relative to the user.

The object's crop region is transformed to screen coordinates using the transform provided by the transform stack 435, and the crop region screen coordinates are pushed onto the clip stack 451. The transform operation is then applied to the image's uncropped bounding box and the operation provides screen coordinates for the image's uncropped bounding box. The renderer 404 paints the image where the crop region screen coordinates overlap the bounding box screen coordinates.

The clip stack 451 acts as an accumulator of view objects as well as groups and zooming objects that have the clip region associated with them. Each of these elements may also contain images as well as other groups and views. For instance, objects may have associated views that provide information about what can be observed 'behind' an object in question. At a particular level of zoom, objects that were not visible when the clip region was selected may become visible when the clip region is rendered. When a dip region is transformed to screen coordinates, the objects and views associated with the clip region are also transformed. When screen coordinates are pushed on the clip stack 451, the clip stack 451 accumulates the screen coordinates for all the objects associated with the clip. These objects are rendered, if the selected level of zoom reveals the objects.

Still referring to FIG. 4, the functionality of the event handler 449 is considered with reference to the object circle 418, using a mouse (such as the mouse 160 of FIG. 1) as a user interface device. When the mouse button is depressed with the cursor located on the image object circle 418, the event handler 449 is called. The call is preferably routed by the event manager 414 as shown by arrow 453. When the mouse is released with the cursor located within the image object 418, event handler 449 determines a corner of a crop region diagonal to the point where the mouse was originally clicked. This point and the point where the mouse was originally clicked define opposite corners of the image's (418) crop region. The crop region exists within the image's (418) bounding box. An example of such a crop region is shown at 315(2) in FIG. 38. Although the region 315(2) is shown as a box, it should be apparent to one of ordinary skill in the art that any desirable shape may be implemented, including free hand drawing. The resulting crop region is defined in the image's (418) local coordinates and for any zooming object for which cropping is desired, the zooming object has local coordinates for its crop region as one of its attributes.

Figure 5:
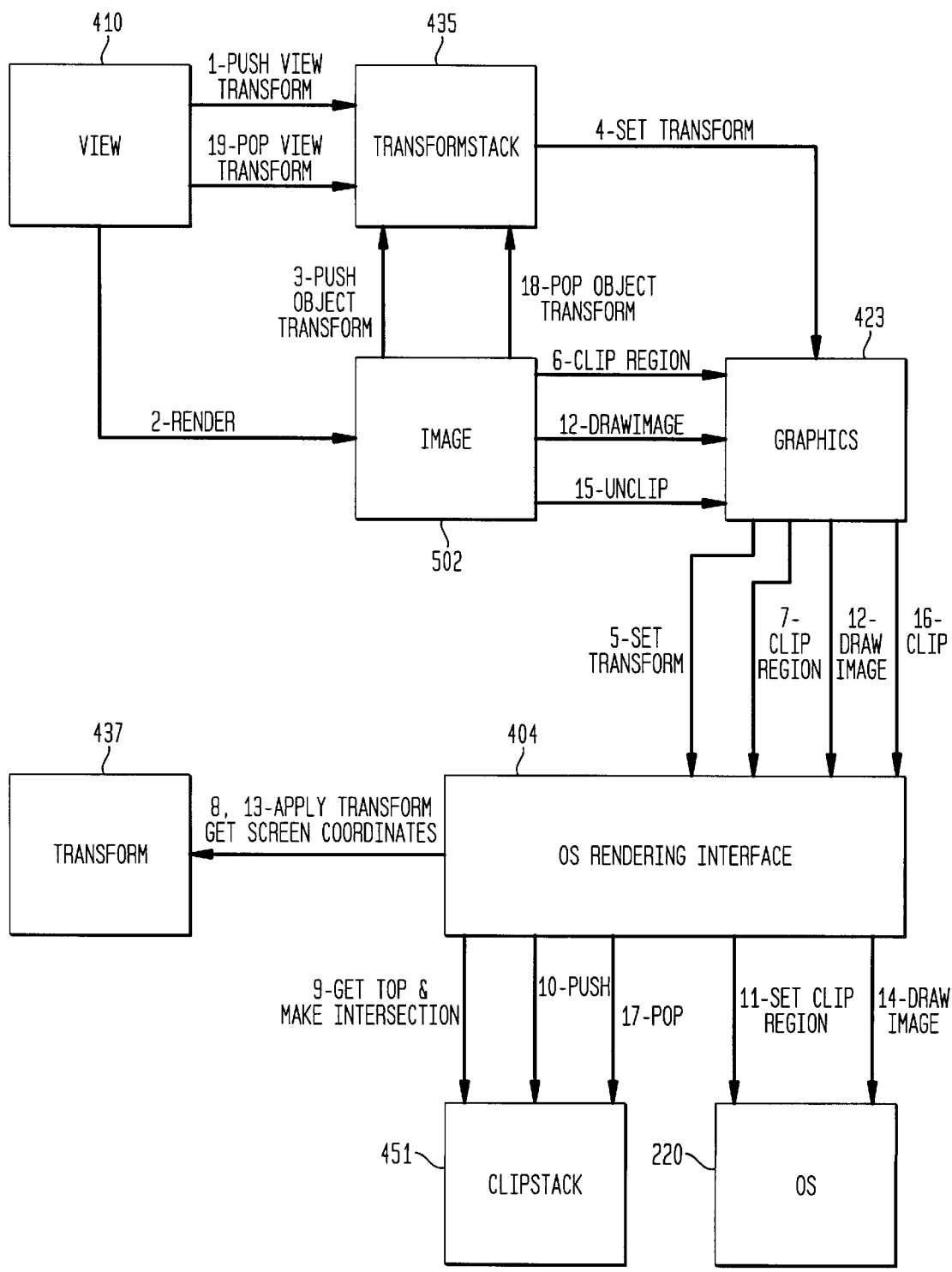
FIG. 5 shows an exemplary command sequence for rendering an image using the architecture of FIG. 4; and, FIGS. 6A and 6B illustrate image cropping and rendering according to the invention.

FIG. 5 schematically illustrates an exemplary command sequence for rendering a cropped image 502 utilizing the zooming architecture of FIG. 4. It should be understood that the transform process block 437 may be considered a part of the OS rendering interface 404. The transform stack 435 and clip stack 451 are objects, and their functionality is described hereafter. When the user initiates a request for rendering a cropped image, view 410 pushes its current transform onto the transform stack 435 and view 404 sends a "render" command to the image 502. Since the image 502 will be a cropped image, its possesses all the attributes of object 416 of FIG. 4 as well as a crop region, as previously described. The image 502 pushes its current transform onto the transform stack 435. The transform stack 435 combines the image 502 and view 404 transform and determines a new transform from the combination. The new transform is operable to provide screen coordinates from local coordinates.

The transform stack 435 commands graphics 423 to "set transform" and graphics 423 sends the "set transform" command to the renderer 404. The command causes the renderer 404 to set the previously determined transform for application in the rendering process. The first transformation is applied to the image's (502) crop region, given in local coordinates. The image 502 sends its crop region to graphics 423 which in turns sends the crop region to the renderer 404.

The renderer 404 applies the transform, as shown in process block 437, to the crop region, and sends a "get top" command to the clip stack 451.

The clip stack is initialized with the top-most screen bounding box. When no crop region is on the stack, the main window coordinates are the top-most window in a windows environment. The renderer 404 makes an intersection with the screen coordinates for the crop region and the top-most coordinates from the stack and then pushes the crop region screen coordinates on the clip stack 451. In response to this push, the clip region is set in the operating system 220. While the crop region screen coordinates are temporarily stored on the clip stack 451, the image (502) sends a "draw image" call to graphics 423.

The "draw image" call includes the image's (502) bounding box, which is transformed to screen coordinates prior to rendering the cropped image. To transform the bounding box, the image 502 sends the bounding box coordinates to the renderer 404 via graphics 423. The renderer 404 applies the same transform it applied to the crop region, as shown in the process block 437. The process 437 returns screen coordinates for the image's bounding box. The renderer 404 asks the operating system 220 to draw the image to the previously set crop region. The operating system 220, having previously received the transformed crop region, paints the image 502 where it overlaps the transformed bounding box.

After rendering, the image 502 asks graphics 423 to uncrop it 502 and the uncrop command is referred to the renderer 404 and the operating system 220. The renderer 404 sends a pop command to the clip stack 451 and the image 502 and view 410 send a pop transform command to the transform stack 435. When the clip stack 451 is popped, the top-most screen coordinates are sent to the renderer 404 for subsequent drawing calls. Thus, where only one crop region is on the stack 451, the pop command causes the renderer 404 to set the top-most window region for subsequent drawing calls. Those objects which do not intersect the top-most window are not part of the drawing call.

Figure 6A:
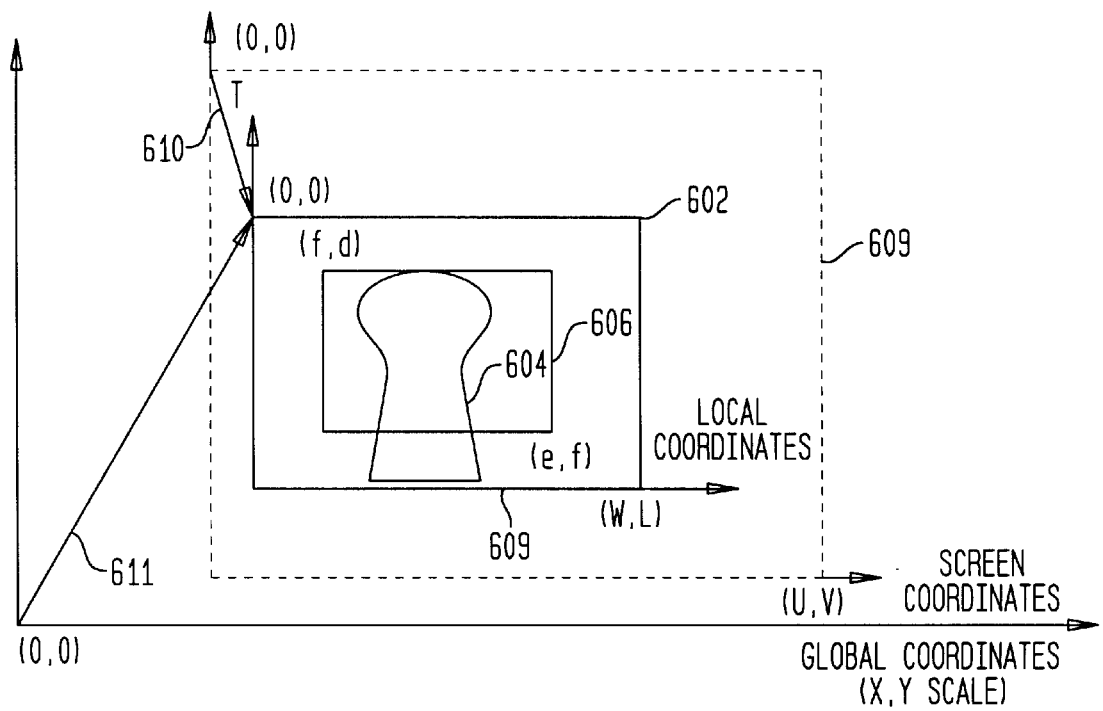

The relationship between a zooming object's local crop region coordinates and screen coordinates is further illustrated with reference to FIGS. 6A and 6B. In FIG. 6A, a zooming object 604 has a bounding box 602 having global coordinates (x, y, scale) where scale is derivative of the level of zoom. Global coordinates locate an object relative to the entire zooming space, and these coordinates do not change unless the object is manipulated directly. The bounding box 602 also has local coordinates of (0,0) and (w,h) where the coordinates locate opposite corners of the box 602. An arrow 611 indicates a transform relationship between the global coordinates and the local coordinates. The image 604 also has a crop box 606 having local coordinates (c,d) and (e,f) at opposite corners. The dashed lines 609 indicate the screen display and screen coordinates (0,0) and (u,v) locate opposite corners of the screen. The transform T (610) is an operation for producing screen coordinates from local coordinates.

Figure 6B:
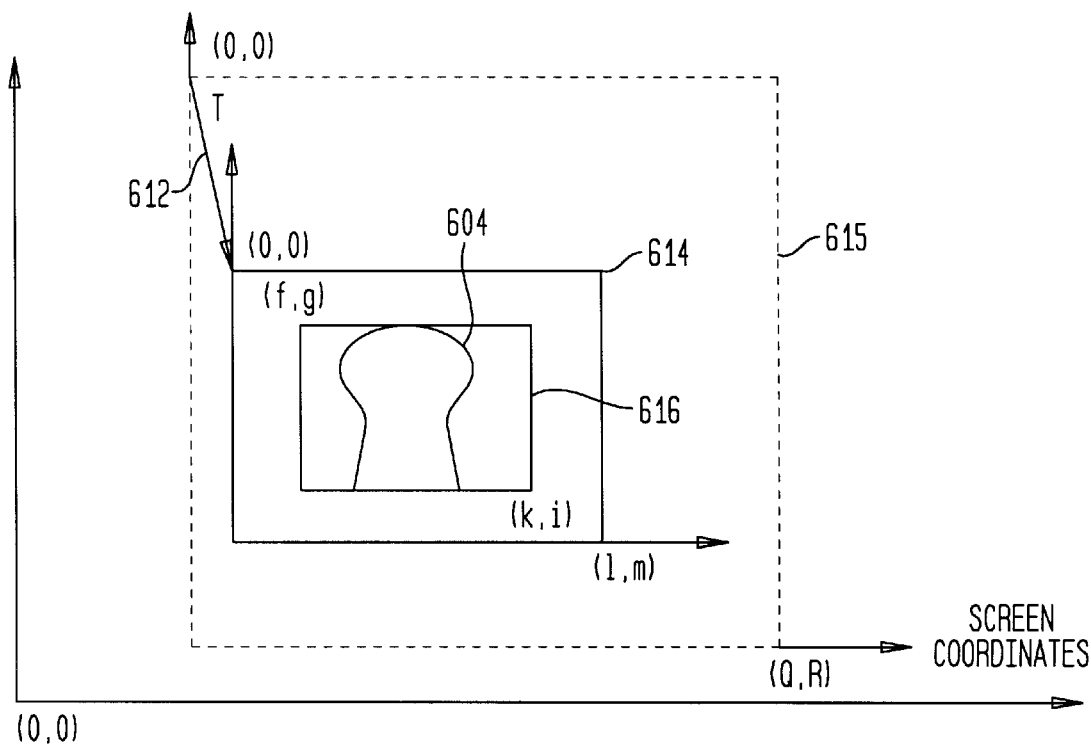

FIG. 6B shows the updated display with the cropped zooming object 604. Its bounding box 614 has local coordinates (0,0) and (l,m) and it is painted on screen 615. The screen coordinates for the image 604 result from the application of the transform 612, which in turn is provided by the transform stack bases upon the object transform 611 of FIG. 6A, the requested zoom level, and the view transform (not shown). The image 604 appears on the display as if it had been rendered in its transformed bounding box 614. No crop box is shown in FIG. 6B because no further cropping is requested. Of course, the image 604 could be further cropped according to the just described invention.

Conclusion

The method and apparatus of the invention provide for image cropping in a zooming environment. Unlike known image editors operating in a zooming environment, an image cropper according to the invention defines a crop region as an attribute of the object and applies a transform operation to an image's crop region and the image's bounding box. An exemplary zooming engine according to the invention comprises a clip stack and a transform stack for storing an image's crop region in screen coordinates and for providing an image's screen transform operation, respectively. A new transform is determined from an image's existing transform and the current view transform, and then the new transform is applied to the crop region and the image's bounding box. When the crop region is rendered, it is rendered within the image's transformed bounding box.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. A zooming engine for cropping and rendering a zooming object having a bounding box in local coordinates, the zooming object contained within a view object, comprising:
   an event handler object in communicative relation to the zooming object and responsive to a selection device, said event handler object operable to attribute crop region local coordinates to the zooming object;
   a transform stack in communicative relation to the zooming object and the view object, said transform stack operable to provide a screen transform, wherein said screen transform converts local coordinates to screen coordinates;
   a renderer responsive to said transform stack and to the zooming object, said renderer operable to apply said screen transform to said crop region local coordinates and to said zooming object bounding box local coordinates; and,
   a clip stack in communicative relation with said renderer for receiving said crop region screen coordinates from said renderer and for providing said crop region screen coordinates when the zooming object is painted, wherein said renderer paints said zooming object at an overlap of said crop region screen coordinates and said bounding box screen coordinates.

2. The zooming engine of claim 1 further comprising a display device, said renderer operable to render the cropped zooming object on said display device.

3. The zooming engine of claim 2 wherein the zooming object and the view object have global coordinates.

4. The zooming engine of claim 3, the zooming object having an associated zooming object transform defining a conversion between zooming object local coordinates and zooming object global coordinates.

5. The zooming engine of claim 4, the view object having a view bounding box and defining a portion of a surface visible on said display device, said view object bounding box defining an outer periphery of the view object.

6. The zooming engine of claim 5, the view object having an associated view transform defining a conversion between said view object local coordinates and said view object global coordinates, said view transform ensuring that said portion of said surface is centered in said view bounding box.

7. The zooming engine of claim 6 wherein said transform stack combines said view object transform and said zooming object transform, said transform stack providing said screen transform therefrom.

8. The zooming engine of claim 2 wherein said clip region is associated with a plurality of objects, said clip stack operable to accumulate screen coordinates for said plurality of objects associated with the clip region, said renderer operable to paint said objects on said display device when a view object contains said plurality of objects.

9. The zooming engine of claim 8 wherein said plurality of objects is selected from the group comprising zooming objects, view objects and object groups.

10. A method for rendering a cropped image for a zooming object having a bounding box, the zooming object contained in a view object, the bounding box having local coordinates, the steps comprising:
    providing a crop region attribute in local coordinates for the zooming object;
    determining a screen transform from a view object transform and a zooming object transform;
    applying said screen transform to said crop region local coordinates and to the bounding box local coordinates, wherein said application step provides bounding box screen coordinates and crop region screen coordinates; and,
    rendering said zooming object where said bounding box screen coordinates and said crop region screen coordinates overlap.

11. The method of claim 10 wherein said providing step further comprises the steps of:
    selecting a crop region on said zooming object; and,
    communicating said crop region to said zooming object.

12. The method of claim 10 wherein the view object comprises a view bounding box defining an outer periphery of the view object, the view object defining a portion of a surface visible on a display device.

13. The method of claim 12 wherein the zooming object has an associated zooming object transform defining a conversion between zooming object local coordinates and zooming object global coordinates and the view object has an associated view transform defining a conversion between view object local coordinates and view object global coordinates, said view transform ensuring that said portion of said surface is centered in said view bounding box, said determining step including the steps of combining said view object transform and said zooming object transform and providing said screen transform therefrom.

14. The method of claim 10 wherein said applying step comprises the further steps of:
    determining said crop region screen coordinates;
    storing said crop region screen coordinates on a stack;
    determining said bounding box screen coordinates; and,
    defining an overlap of said crop region screen coordinates and said bounding box screen coordinates.

15. The method of claim 10 wherein said rendering step paints said crop region on a display device.

16. The method of claim 10 wherein said crop region is associated with a plurality of objects, said applying step including the step of determining recursively the screen coordinates of said associated objects.

17. The method of claim 16 wherein said plurality of objects is selected from the group comprising zooming objects, view objects and object groups.

18. The method of claim 17 including the further step of selecting a predetermined zoom level, wherein said zoom level is associated with a view object.

19. The method of claim 18 wherein said rendering step paints said plurality of objects when said plurality of objects are contained in said selected view object.

* * * * *

UNITED STATES PATENT AND TRADEMARK OFFICE
CERTIFICATE OF CORRECTION

PATENT NO. : 6,304,271 B1
DATED : October 16, 2001
INVENTOR(S) : Nehme

Page 1 of 1

It is certified that error appears in the above-identified patent and that said Letters Patent is hereby corrected as shown below:

<u>Title page,</u>
Item [75], after "New York" delete "Township".

<u>Column 5,</u>
Line 26, "Javae" should read -- Java® --.

<u>Column 9,</u>
Line 13, "dip" should read -- clip --.

Signed and Sealed this

Second Day of April, 2002

Attest:

JAMES E. ROGAN
*Attesting Officer*  *Director of the United States Patent and Trademark Office*